US007683906B2

(12) United States Patent
Senior et al.

(10) Patent No.: US 7,683,906 B2
(45) Date of Patent: Mar. 23, 2010

(54) FRAME BUFFER CONTROL FOR SMOOTH VIDEO DISPLAY

(75) Inventors: Jay Senior, Redmond, WA (US); Stephen J. Estrop, Carnation, WA (US); Anuj B. Gosalia, Redmond, WA (US); David R. Blythe, Kirkland, WA (US); Joseph C. Ballantyne, Redmond, WA (US); Kan Qiu, Bellevue, WA (US); Gregory D. Swedberg, Bellevue, WA (US); John (Mingtzong) Lee, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 837 days.

(21) Appl. No.: 11/359,106

(22) Filed: Feb. 22, 2006

(65) Prior Publication Data

US 2007/0195101 A1 Aug. 23, 2007

Related U.S. Application Data

(63) Continuation of application No. 11/172,061, filed on Jun. 30, 2005, now abandoned.

(51) Int. Cl.
*G06T 15/00* (2006.01)

(52) U.S. Cl. ........................ 345/539; 345/531; 345/545

(58) Field of Classification Search ......... 345/545–547, 345/531–533, 539
See application file for complete search history.

(56) References Cited

U.S. PATENT DOCUMENTS

| | | | | |
|---|---|---|---|---|
| 6,311,204 | B1 * | 10/2001 | Mills | 345/558 |
| 6,456,340 | B1 * | 9/2002 | Margulis | 348/745 |
| 6,525,723 | B1 * | 2/2003 | Deering | 345/419 |
| 6,567,091 | B2 * | 5/2003 | Dye et al. | 345/501 |
| 7,177,918 | B2 * | 2/2007 | Joshi et al. | 709/219 |

* cited by examiner

*Primary Examiner*—Phu K Nguyen

(57) ABSTRACT

Video frame buffers are controlled using a sequence of new-frame-indicators (e.g., FLIP) and no-new-frame-indicators (e.g., NOFLIP) in a frame indicator queue that is accessed with each display refresh. Video samples are loaded into a chain of video frame buffers that is "rotated" during the vertical blanking signal of the display to swap an old frame buffer out for a new frame buffer. The rotations of the frame buffer chain are controlled based on the frame indicators in the frame indicator queue to present new video samples to the display in a regular pattern, thereby providing smooth video playback.

20 Claims, 4 Drawing Sheets

FRAME BUFFER CONTROL FOR SMOOTH VIDEO DISPLAY

RELATED APPLICATIONS

This application is a continuation of U.S. patent application Ser. No. 11/172,061, filed Jun. 30, 2005, titled "FRAME BUFFER CONTROL FOR SMOOTH VIDEO DISPLAY", which is hereby incorporated herein by reference.

BACKGROUND

Digital video technology has advanced to provide high quality digital video playback on a computer. In a common configuration, digital video samples are received from a signal source (e.g., a hard disk or a video camera). A decoder module decodes incoming video samples and then loads each decoded sample into an available frame buffer of a video adapter at an input frame rate. The video adapter reads the video data from a populated frame buffer and sends the video data to a display (e.g., a computer monitor) on a frame-by-frame basis, in accordance with a display refresh rate.

The refresh rate specifies the number of frames displayed per unit time (e.g., frames per second). The period between the displays (or "refreshes") of temporally adjacent frames is termed the "vertical blanking interval", during which no video frame data is transmitted to the display. In many configurations, the input sample rate may be different from the refresh rate, and therefore, the incoming samples are likely to be out-of-sync with the frame refreshes.

As such, to accommodate the different rates, the availability of a new sample for display, which is dependent on the input sample rate, is synchronized with the refresh rate to achieve a smooth video display. For example, existing digital video systems synchronize sequential frame buffer reads with the refresh rate using timed software calls, which are dependent on system clocks and the system processor (e.g., the CPU). However, because timed software calls are so sensitive to CPU usage, spikes in CPU utilization can perturb this synchronization and negatively impact the video playback quality by introducing irregular playback and mis-alignment with associated audio playback.

SUMMARY

Implementations described and claimed herein address the foregoing problems by controlling frame buffers using new-frame-indicators (e.g., FLIP) and no-new-frame-indicators (e.g., NOFLIP) in a frame indicator queue that is accessed with each display refresh. Video samples are loaded into a chain of frame buffers that is "rotated" during the vertical blanking signal of the display to swap an old frame buffer out for a new frame buffer. The rotations of the frame buffer chain are controlled based on the frame indicators in the frame indicator queue to present new samples to the display in a regular pattern, thereby providing smooth video playback.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

Other implementations are also described and recited herein.

BRIEF DESCRIPTIONS OF THE DRAWINGS

DETAILED DESCRIPTIONS

As discussed, input sample rates and display refresh rates are typically of different frequencies. For example, given an input sample rate of 24 samples per second (or frames per second) and a refresh rate of 60 frames per second, there is not a one-to-one correspondence between input samples and displayed frames in each refresh period. Accordingly, certain samples may be re-used in multiple adjacent refresh periods, delaying rotation of the frame buffer chain until an appropriate refresh period.

By making this re-use follow a regular pattern, the video playback can appear smooth. In contrast, an irregular pattern can make the video playback appear jerky and out-of-sync with an associate audio signal. For the 24 samples per second input sample rate and the 60 frames per second refresh rate, for example, a regular pattern of 2 refresh periods per sample, 3 refresh periods per sample, 2 refresh periods per sample, etc. may be employed. In one implementation, a queue of frame indicators in the video adapter can be accessed with each refresh period to determine whether to rotate the chain of frame buffers, thereby avoiding the dependence on CPU sensitive software calls.

Figure 1:
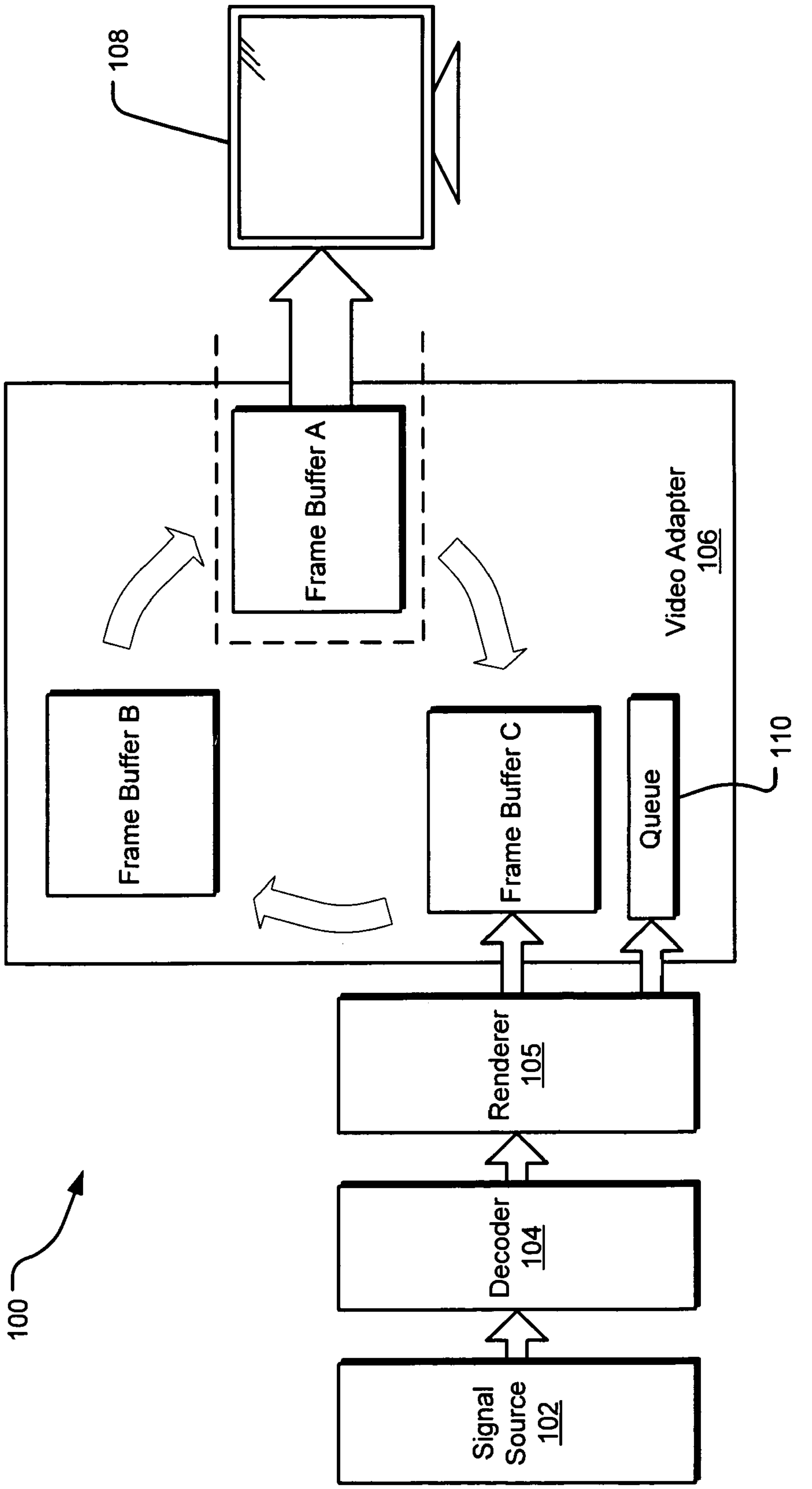
FIG. 1 illustrates an exemplary video system.

FIG. 1 illustrates an exemplary video system 100. A signal source 102 provides a multimedia signal, which includes video samples and possibly an audio signal and other information. Exemplary signal sources may include without limitation video cameras, set top boxes, hard disks or other persistent storage mediums, and network sources. In one implementation, the video samples are split from the multimedia signal and passed to a decoder 104. If there is audio signal, it may be passed to an audio adapter (not shown) associated with the video system 100.

The decoder 104 decodes the individual video samples and passes them into rotating frame buffers A, B, and C, which reside in memory of a video adapter 106 according to references (e.g., addresses) provided by a renderer 105. The current frame buffer (frame buffer A in the illustration) contains a video sample that is displayed on a video display 108 in the current refresh period. Frame buffer B contains a subsequent video sample received from the decoder 104. In a previous refresh cycle, frame buffer C was the current frame buffer, but in the current refresh cycle, frame buffer C initially contains an old (used) video sample. Thereafter, the decoder 104 can write a new video sample into frame buffer C, overwriting the older video sample.

By re-using each sample in multiple refresh periods, the input sample rate can effectively synchronize with the refresh rate. For example, the sample in frame buffer A can be displayed in three refresh periods, then the frame buffers can be virtually rotated (e.g., frame buffer B becomes the current frame buffer, frame buffer C is designated as next in the sequence, and frame buffer A is made available to receive a new sample). Then, the sample in frame buffer B can be displayed in two refresh periods before another rotation.

As discussed, the decoder 104 passes a sample to the next available frame buffer. In addition, to avoid or minimize effects of CPU usage spikes, the render 105 evaluates the sample time, the frame time, the input sample rate, and the refresh rate to send one or more frame indicators to a queue 110 in the video adapter 106. Exemplary frame indicators may include without limitation: (1) a new-frame-indicator, which instructs the video adapter 106 to rotate the frame buffer chain to make a new sample available in the current frame buffer; and (2) a no-new-frame-indicator, which instructs the video adapter 106 to re-use the current frame buffer.

The video adapter 106 accesses (e.g., reads and removes) the frame indicator at the head of the queue 110 with each refresh period. If the head indicator is a no-new-frame-indicator, the video adapter 106 re-displays the sample in the current frame buffer. Alternatively, if the head indicator is a new-frame-indicator, the video adapter 106 rotates the frame buffer chain to make the next frame buffer the current frame buffer and then sends the sample in the new current frame buffer to the display 108. The previously current frame buffer is then made available to the decoder 104 to receive a new sample.

Figure 2:
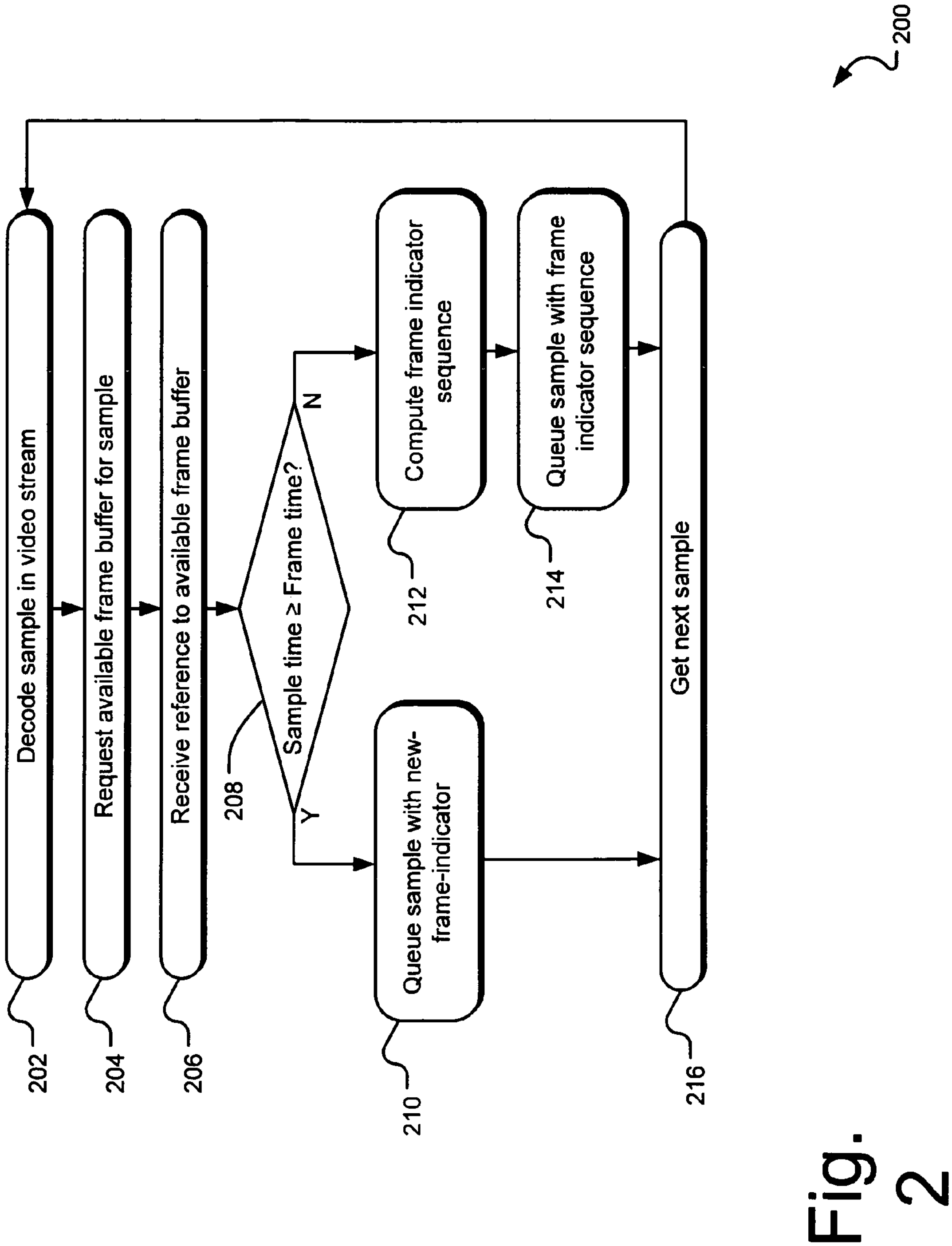
FIG. 2 illustrates exemplary operations for loading frame buffers in association with a frame indicator sequence.

FIG. 2 illustrates exemplary operations 200 for loading frame buffers in association with a frame indicator sequence. A decoding operation 202 receives a sample in a video stream and decodes the sample according to the encoding format of the stream. Exemplary video encoding formats include Advanced Streaming Format (ASF), QuickTime, MPEG-1, MPEG-2, and MPEG-4. Each sample is annotated with a sample time identifying the relative time of the sample in the overall sample sequence. After the sample is decoded, a requesting operation 204 requests an available frame buffer from the video adapter. The video adapter responds with a reference to an available frame buffer in the frame buffer chain, which is received by the decoder in a receiving operation 206.

A decision operation 208 considers the sample time of the decoded sample relative to a current frame time, where the frame time is the clock time of the currently displayed frame. If the sample time is greater or equal to the frame time, then the decoded sample should be displayed as soon a possible (i.e., the sample lags behind the frame time of the display and therefore should be displayed quickly to catch up with the frame time). Therefore, a loading operation 210 loads the sample into the available frame buffer, according to the reference from the video adapter, and loads a new-frame-indicator (e.g., FLIP) into a frame indicator queue. In a future refresh period, the video adapter will read and remove the loaded new-frame-indicator from the queue and then it will rotate the frame buffer chain to make the frame buffer containing the loaded sample the current frame buffer.

In contrast, if the sample time is less than the clock time, a computation operation 212 computes a frame indicator sequence. In one implementation, a relationship between the input sample rate (SR) and the refresh rate (RR) is considered to allow the samples to sync up with the refresh periods in a regular (i.e., smooth) pattern. Each rate has an associated period, such that a sample period SP=1/SR and a refresh period RP=1/RR. In a specific example based on an input sample rate of 24 samples per second and a refresh rate of 60 frames per second, the following parameters are given:

$$SR = 24 \text{ samples/sec}$$

$$SP = \frac{1000}{24} \text{ ms}$$

-continued $$RR = 60 \text{ frames/sec}$$

$$RP = \frac{1000}{60} \text{ ms}$$

A frame count (FC) represents the number of times a given sample will be displayed in a single refresh period. A rollover time RT represents the amount of time the sample period exceeds the aggregate frame period of the frame count. An exemplary frame indicator sequence computation is based on the following general algorithms:

$$\left.\begin{aligned} FC_n &= \text{round}\left(\frac{SP}{RP}\right) \\ RT_n &= SP - (FC_n * RP) \end{aligned}\right\} \quad \text{for } n = 0$$

$$\left.\begin{aligned} FC_n &= \text{round}\left(\frac{(RT_{n-1} + SP)}{RP}\right) \\ RT_n &= RT_{n-1} + SP - (FC_n * RP) \end{aligned}\right\} \quad \text{for } n > 0$$

Accordingly, in the first refresh period (n=0), a frame count for the specific example given above is computed as follows:

$$\begin{aligned} FC_0 &= \text{round}\left(\frac{SP}{RP}\right) \\ &= \text{round}\left(\frac{\frac{1000}{24}}{\frac{1000}{60}}\right) \\ &= \text{round}\left(\frac{60}{24}\right) \\ &= 2 \end{aligned}$$

As such, the first sample of the video stream should be used in two consecutive refresh periods.

Likewise, in the first refresh period (n=0), a rollover time results as follows:

$$\begin{aligned} RT_0 &= SP - (FC_0 * RP) \\ &= \frac{1000}{24} - \left(2 * \frac{1000}{60}\right) \\ &= \frac{1000}{24} - \frac{2000}{60} \\ &= \frac{10000 - 8000}{240} \\ &= \frac{200}{24} \text{ ms} \end{aligned}$$

In the next refresh cycle (n=1), the rollover time is considered:

$$
\begin{aligned}
FC_1 &= \text{round}\left(\frac{RT_0+SP}{RP}\right)\\
&= \text{round}\left(\frac{\frac{200}{24}+\frac{1000}{24}}{\frac{1000}{60}}\right)\\
&= \text{round}\left(\frac{\frac{1200}{24}}{\frac{1000}{60}}\right)\\
&= 3
\end{aligned}
$$

$$
\begin{aligned}
RT_1 &= RT_0+SP-(FC_1*RP)\\
&= \frac{200}{24}+\frac{1000}{24}-\left(3*\frac{1000}{60}\right)\\
&= \frac{1200}{24}-\frac{3000}{60}\\
&= 0
\end{aligned}
$$

Over several refresh periods, the values are:

TABLE 1

Exemplary Frame Count Sequence and Rollover Times

| n | $FrameCount_n$ | $RT_n$ |
|---|---|---|
| 0 | 2 | $\frac{200}{24}$ |
| 1 | 3 | 0 |
| 2 | 2 | $\frac{200}{24}$ |
| 3 | 3 | 0 |

Therefore, for example, with a frame count of 2, the frame indicator sequence is: a "new frame" indicator followed by a "no-new frame" indicator, such that the associated sample is rotated into the current frame buffer position (responsive to the new-frame-indicator) where it remains for a total of two refresh periods. Likewise, a frame count of 3 results in a frame indicator sequence of a "new frame" indicator followed by two "no-new frame" indicators, such that the associated sample is rotated into the current frame buffer position (responsive to the new-frame-indicator) where it remains for a total of three refresh periods. The pattern can continue as dictated by the frame sequence computation.

It should be understood however that the 24 sample per second rate discussed herein is based on an imaginary ideal clock. In practice, a physical clock (e.g., an external clock supplied through the cable head-end or internal audio hardware) is used as the "master clock". Therefore, the effective input sample rate may be represented by 24*(1+d), where d represents the deviation of the external clock versus a perfect clock. For example, if d=3%, the master clock is faster than a perfect clock by +3%, the effective SR=24*(1+0.03)=24.72. As a result, the sequence pattern would then vary slightly —3232 . . . 323332 . . . Likewise, if the master clock is slower than the perfect clock, the effective pattern could vary slightly (e.g., 3232 . . . 322232 . . . ). Hence, in this case, the synchronization can be achieved without dropping samples by altering the frame buffer pattern. In yet other circumstances, the renderer may merely throw samples away to maintain the smoothness of the playback and the synchronization between the audio and the video.

Based on the frame indicator sequence, a loading operation 214 loads the sample into the available frame buffer, according to the reference from the video adapter, and loads the computed frame indicator sequence into a frame indicator queue. In a future refresh period, the video adapter reads (and removes) the loaded new-frame-indicator from the queue and then it will rotate the frame buffer chain to make the frame buffer containing the loaded sample the current frame buffer and then maintain the current frame buffer for each refresh period corresponding to the number of no-new-frame-indicators in the queue.

A next operation 216 gets the next sample in the stream and returns to the decoding operation 202. The process can cycle through each sample in the stream until the stream is exhausted.

Figure 3:
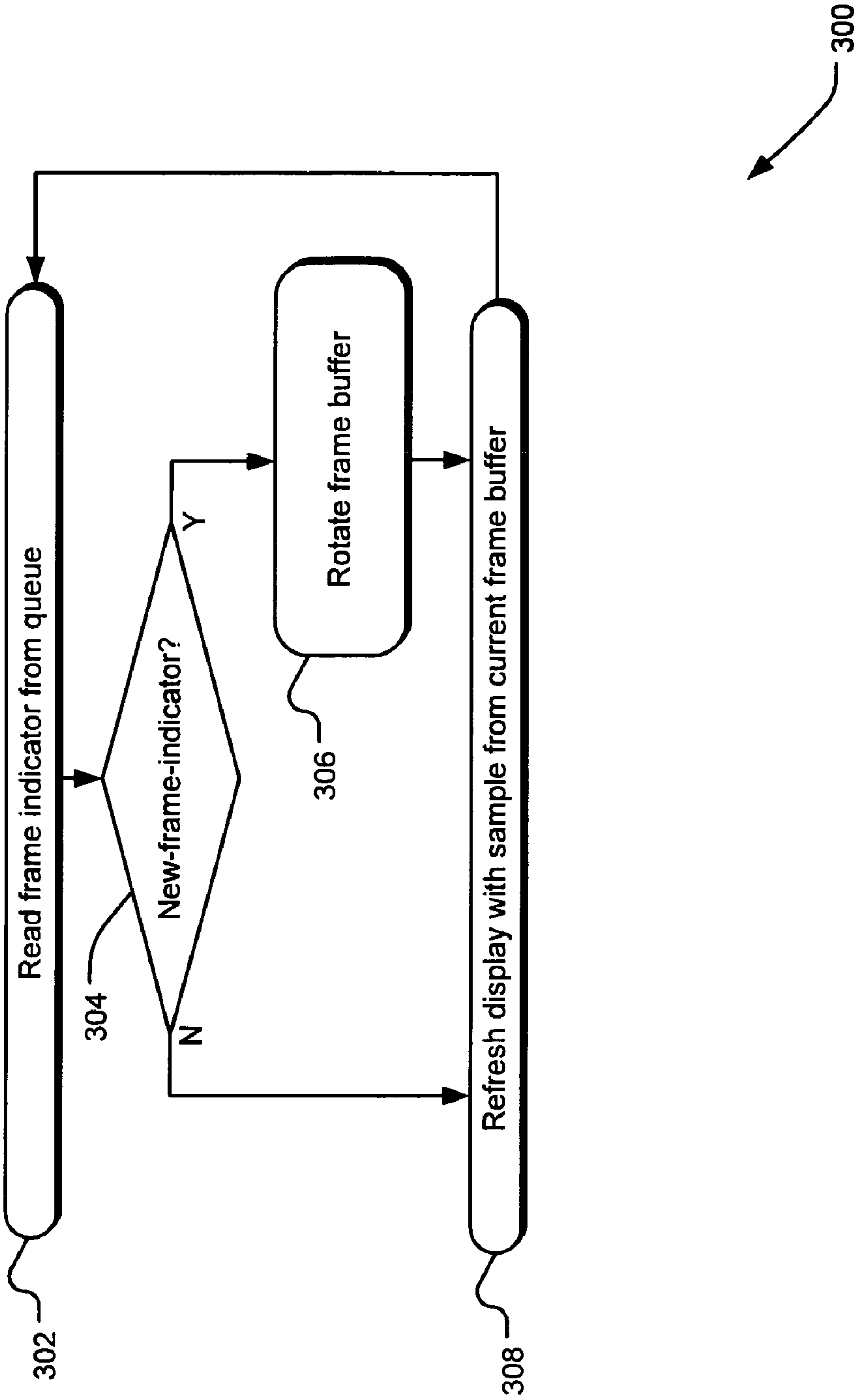
FIG. 3 illustrates exemplary operations for rotating frame buffers based on a frame indicator sequence.

FIG. 3 illustrates exemplary operations 300 for rotating frame buffers based on a frame indicator sequence recorded in a queue. With each refresh period, a read operation 302 reads and removes the frame indicator at the head of the queue. If the read frame indicator is a new-frame-indicator, as determined by decision operation 304, a rotation operation 306 rotates the frame buffer chain to make a frame buffer the current frame buffer (i.e., one containing a new sample). If the read frame indicator is a no-new-frame-indicator, as determined by decision operation 304, no rotation is performed. A refresh operation 308 refreshes the display using the sample from the current frame buffer. Then, processing return to read operation 302 for the next refresh period.

As such, when a sample is sent to the video adapter with one or more frame indicators, the video adapter reads a sequence of one or more frame indicators associated with the sample, at least one frame indicator per refresh period. These indicators control whether to rotate the frame buffers to a new sample in a given refresh period and controls the synchronization of the samples with the refresh rate.

Figure 4:
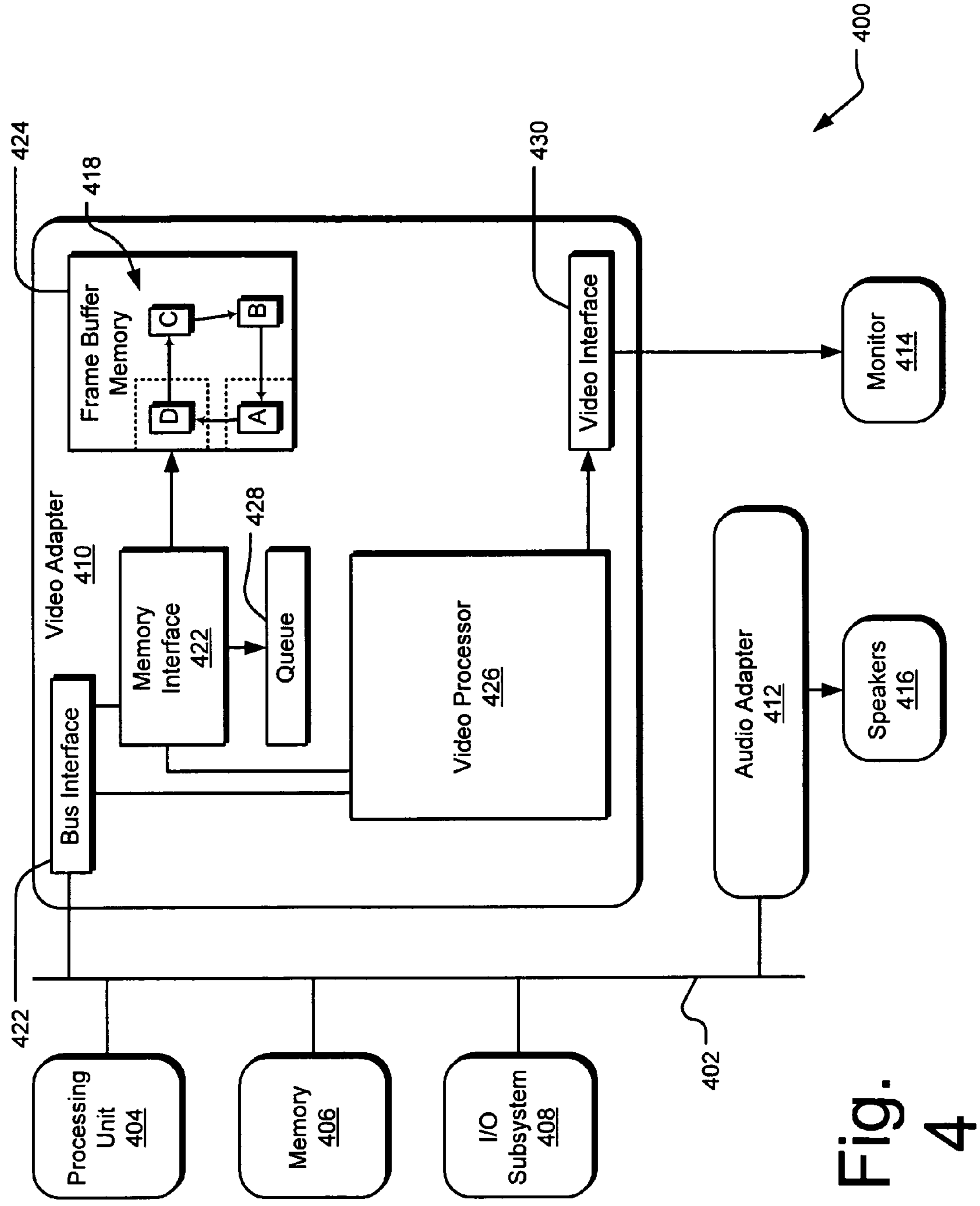
FIG. 4 illustrates a schematic of an exemplary video system.

FIG. 4 illustrates a schematic of an exemplary video system 400. A processing unit 404, system memory 406, and an I/O subsystem 408 are operatively coupled with a video adapter 410 and an audio adapter 412 by a system bus 402. There may be one or more processing units 404, such that the processor of the exemplary video system can comprise a single central-processing unit (CPU) or a plurality of processing units, commonly referred to as a parallel processing environment. The video system 400 may be a conventional computer, a distributed computer, or any other type of computer; the invention is not so limited.

The system bus 402 may be any of several types of bus structures including a memory bus or memory controller, a peripheral bus, a switched fabric, point-to-point connections, and a local bus using any of a variety of bus architectures. The system memory 406 may also be referred to as simply the memory, and can include read-only memory (ROM) and/or random access memory (RAM). A basic input/output system (BIOS), containing the basic routines that help to transfer information between elements within the video system 400, such as during start-up, may stored in ROM, for example.

The exemplary video system 400 further includes one or more storage unit for reading from and writing to a persistent storage medium, such as a magnetic hard disk, a magnetic floppy disk, an optical disk, or a flash memory disk. The storage units and their associated computer-readable media provide nonvolatile storage of computer-readable instructions, data structures, program modules and other data for the video system 400. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules may be stored on the persistent storage medium, including an operating system, one or more application programs, other program modules, and program data. A user may enter commands and information into the video system 400 through input devices such as a keyboard and a pointing device. Other input devices (not shown) may include a microphone, joystick, game pad, satellite dish, scanner, or the like. These and other input devices are often connected to the processing unit 404 through a serial port interface that is coupled to the system bus, but may be connected by other interfaces, such as a parallel port, game port, or a universal serial bus (USB). A monitor 414 or other type of display device is also connected to the system bus 402 via an interface, such as a video adapter 410. In addition to the monitor, computers typically include other peripheral output devices (not shown), such as speakers 416.

The exemplary video system 400 may operate in a networked environment using logical connections to one or more remote computers. These logical connections are achieved by a communication device coupled to or a part of the video system 400; the invention is not limited to a particular type of communications device. The remote computer may be another computer, a server, a router, a network PC, a client, a peer device or other common network node, and typically includes many or all of the elements described above relative to the video system 400. The logical connections to a video system 400 may include a local-area network (LAN) and a wide-area network (WAN). Such networking environments are commonplace in office networks, enterprise-wide computer networks, intranets and the Internet, which are all types of networks.

When used in a LAN-networking environment, the video system 400 is connected to the local network through a network interface or adapter, which is one type of communications device. When used in a WAN-networking environment, the video system 400 typically includes a modem, a network adapter, a type of communications device, or any other type of communications device for establishing communications over the wide area network. The modem, which may be internal or external, is connected to the system bus 402 via the serial port interface. In a networked environment, program modules depicted relative to the video system 400, or portions thereof, may be stored in the remote memory storage device. It is appreciated that the network connections shown are exemplary and other means of and communications devices for establishing a communications link between the computers may be used.

In an exemplary implementation, a decoder, a renderer, and other modules may be incorporated as part of the operating system, application programs, or other program modules. The sample data, the frame count, and other data may be stored as program data. A video system may also include a dedicated video capture device integrated into a video adapter, which can optionally send the video signal to the display. The signal may or not be compressed or written to disk before being sent to the video adapter. Other configurations are also contemplated.

A multimedia signal can be received from a signal source, such as a hard disk or a video camera, with the audio signal being split from the video signal, decoded, and sent to the audio adapter 412 for playback over the speakers 416. The video signal is decoded and samples of the video signal are loaded into frame buffers 418.

The video adapter 410 includes a bus interface 420, a memory interface 422, frame buffer memory 424, a video processor 426, a queue 428, and a video interface 430. The bus interface 420 handles communications between the video adapter 410 and the other components of the exemplary video system 400 through the system bus 402. The memory interface 422 manages access between the frame buffer memory 422 and the queue 424, and the bus interface 420 and the video processor 426. The frame buffer memory 422 includes a rotatable chain of the frame buffers 418, which are addressable by references (such as addresses) by software executed by the processing unit 404. The references can be provided to the software, which can cause sample data to be loaded into a specific frame buffer. The queue 428 can be loaded by the software with frame indicators in a FIFO-type manner, although various memory structures may be employed. The video processor 426 rotates the frame buffer chain in the frame buffer memory 422 based on frame indicators in the queue 428 and displays video samples read from frame buffers at a refresh rate (e.g., frames per second).

In one implementation, the renderer can cancel or purge frame indicators in the queue. For example, a user may wish to pause or stop playback at a certain frame. Without a purging option, the desired result of a pause or stop command will be delayed until the new-frame-indicators in the queue are depleted. As such, in response to a pause or stop command, the renderer can signal the adapter to purge the queue or to stop checking the queue until receiving a restart command. If the queue is purged, the renderer can repopulate the queue with frame indicators when/if the restart command is received.

In an alternative implementation, the samples and frame indicators in the queue can be manipulated to ensure that the video playback remains synchronized to an external clock. For example, an audio adapter may output an audio clock signal to which video playback should be synchronized in order to maintain proper video-audio synchronization. If it is determined that the next video sample will be too late relative to the external clock, selective samples can be omitted from the queue. For example, the renderer can merely "throw away" the late sample by not storing it in a frame buffer and by not loading associated frame indicators into the queue. If it is determined that the next video frame is too early relative to the external clock, the queue can be manipulated to selectively insert additional no-new-frame indicators in the queue to ensure that the current frame is presented at the correct external clock time and still maintains smooth playback.

The technology described herein is implemented as logical operations and/or modules in one or more systems. The logical operations may be implemented (1) as a sequence of processor-implemented steps executing in one or more computer systems and (2) as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Since many embodiments of the invention can be made without departing from the spirit and scope of the invention, the invention resides in the claims hereinafter appended. In particular, it should be understood that the described technology may be employed independent of a personal computer. Other embodiments are therefore contemplated.

What is claimed is:

1. A method of refreshing a display, the method comprising:

computing a frame indicator sequence comprising one or more frame indicators for each frame sample in a sequence of frame samples to be output to the display;

loading each frame sample into an available video frame buffer of a plurality of rotatable video frame buffers of a video adapter;

obtaining, by the video adapter from a queue containing the frame indicator sequence, a frame indicator associated with a current refresh period of the display;

refreshing the display by delaying rotation of the plurality of rotatable video frame buffers and re-using a previously-displayed frame sample contained in a current video frame buffer, if the obtained frame indicator indicates no new frame for the current refresh period; and refreshing the display by rotating the plurality of rotatable video frame buffers to a next video frame buffer and using a frame sample that has not yet been displayed, if the obtained frame indicator indicates a new frame for the current refresh period.

2. The method of claim 1 wherein the frame indicators include at least new-frame-indicators and no-new-frame indicators.

3. The method of claim 2 wherein a new-frame-indicator instructs the video adapter to rotate the plurality of rotatable video frame buffers.

4. The method of claim 2 wherein a no-new-frame-indicator instructs the video adapter to delay the rotation of the plurality of rotatable video frame buffers.

5. The method of claim 1 wherein the previously-displayed frame sample was displayed in an immediately previous refresh period.

6. The method of claim 1 wherein the frame indicator sequence contains a substantially regular pattern of new-frame indicators and no-new-frame indicators associated with multiple refresh periods.

7. The method of claim 6 wherein the pattern of new-frame indicators and no-new-frame indicators controls the rotation of the plurality of rotatable video frame buffers to present new video samples to the display in a substantially regular pattern.

8. The method of claim 7, wherein the rotation of the plurality of rotatable video frame buffers is performed during a vertical blanking interval of the display to swap an old frame buffer out for a new frame buffer.

9. The method of claim 1 wherein the frame indicator sequence contains a frame indicator associated with each refresh period.

10. The method of claim 1 wherein the frame indicator sequence contains a new-frame indicator followed by one or more no-new-frame indicators for using a given frame sample in consecutive refresh periods.

11. A computer-readable storage medium having computer-executable instructions stored thereon for performing a computer process comprising:

computing a frame indicator sequence comprising one or more frame indicators for each frame sample in a sequence of frame samples to be output to a display;

loading each frame sample into an available video frame buffer of a plurality of rotatable video frame buffers;

obtaining, from a queue containing the frame indicator sequence, a frame indicator associated with a current refresh period of the display;

refreshing the display by delaying rotation of the plurality of rotatable video frame buffers and re-using a previously-displayed frame sample contained in a current video frame buffer, if the obtained frame indicator indicates no new frame for the current refresh period; and refreshing the display by rotating the plurality of rotatable video frame buffers to a next video frame buffer and using a frame sample that has not yet been displayed, if the obtained frame indicator indicates a new frame for the current refresh period.

12. A video adapter for refreshing a display, the video adapter comprising:

a plurality of rotatable video frame buffers for loading, into an available video frame buffer, each frame sample in a sequence of frame samples to be output to a display;

a memory interface that provides access to the plurality of rotatable video frame buffers and a queue containing a frame indicator sequence comprising one or more frame indicators for each frame sample in the sequence of frame samples;

a video processor that obtains from the queue a frame indicator associated with a current refresh period of the display; and a video interface that refreshes the display by delaying rotation of the plurality of rotatable video buffers and re-using a previously-displayed frame sample contained in a current video frame buffer, if the obtained frame indicator indicates no new frame for the current refresh period and that refreshes the display by rotating the plurality of rotatable video buffers to a next video frame buffer and using a frame sample that has not yet been displayed, if the obtained frame indicator indicates a new frame for the current refresh period.

13. The system of claim 12 wherein the frame indicators include at least new-frame-indicators and no-new-frame indicators.

14. The system of claim 12 wherein the frame indicator sequence contains a substantially regular pattern of new-frame indicators and no-new-frame indicators associated with multiple refresh periods.

15. The system of claim 14 wherein the pattern of new-frame indicators and no-new-frame indicators controls the rotation of the plurality of rotatable video frame buffers to present new video samples to the display in a substantially regular pattern.

16. The system of claim 15, wherein the rotation of the plurality of rotatable video frame buffers is performed during a vertical blanking interval of the display to swap an old frame buffer out for a new frame buffer.

17. The system of claim 12 wherein the frame indicator sequence contains a frame indicator associated with each refresh period.

18. The system of claim 12 wherein the frame indicator sequence contains a new-frame indicator followed by one or more no-new-frame indicators for using a given frame sample in consecutive refresh periods.

19. The system of claim 12 wherein a new-frame-indicator instructs the video adapter to rotate the plurality of rotatable video frame buffers.

20. The system of claim 12 wherein a no-new-frame-indicator instructs the video adapter to delay the rotation of the plurality of rotatable video frame buffers.

* * * * *